Figure 1:
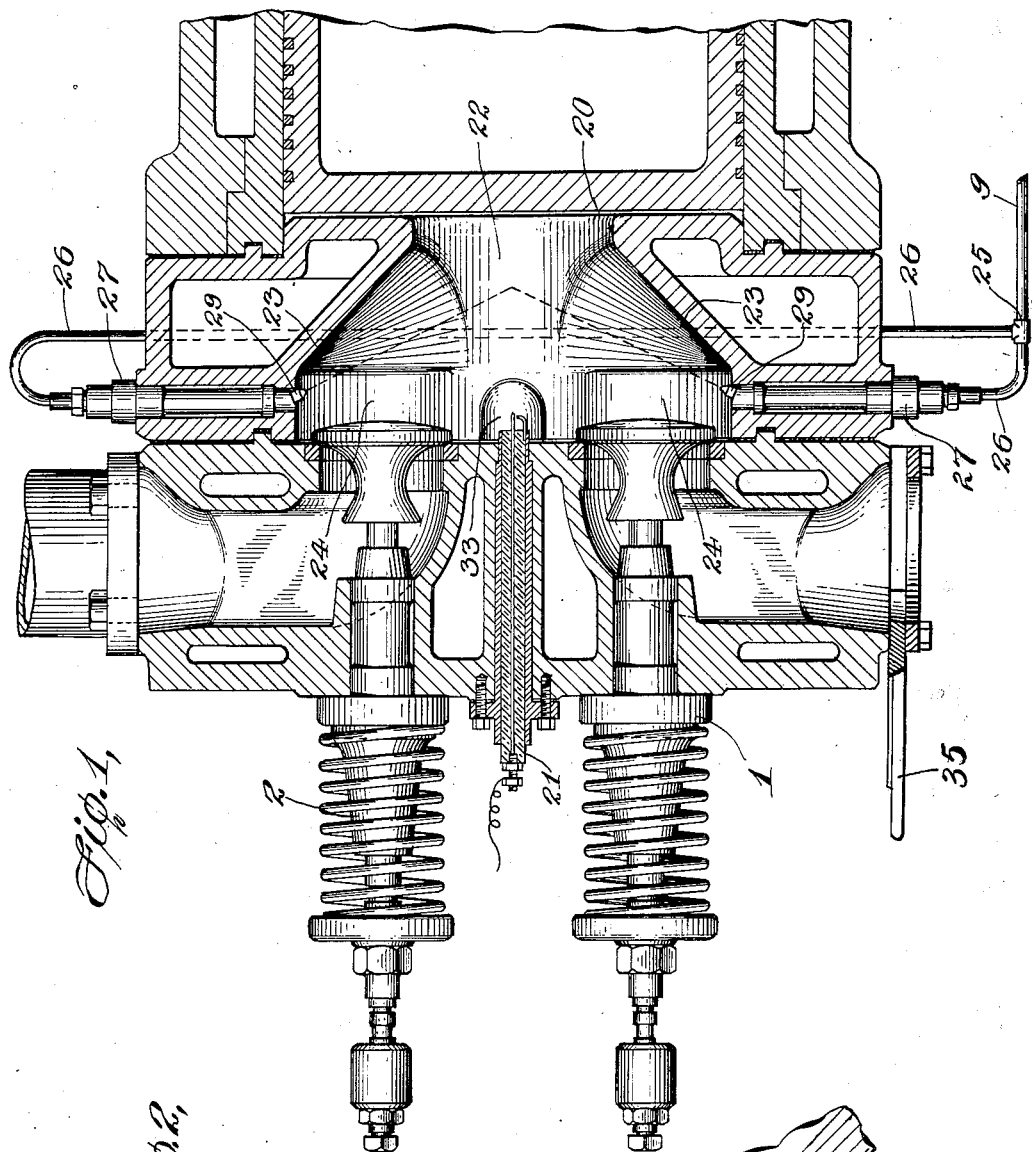

Nov. 25, 1924.

W. T. PRICE

OIL ENGINE

Filed Dec. 10, 1917

1,517,015

3 Sheets-Sheet 1

INVENTOR
William T. Price
BY Attorney
ATTORNEY

Nov. 25, 1924.
W. T. PRICE
OIL ENGINE
Filed Dec. 10, 1917
1,517,015
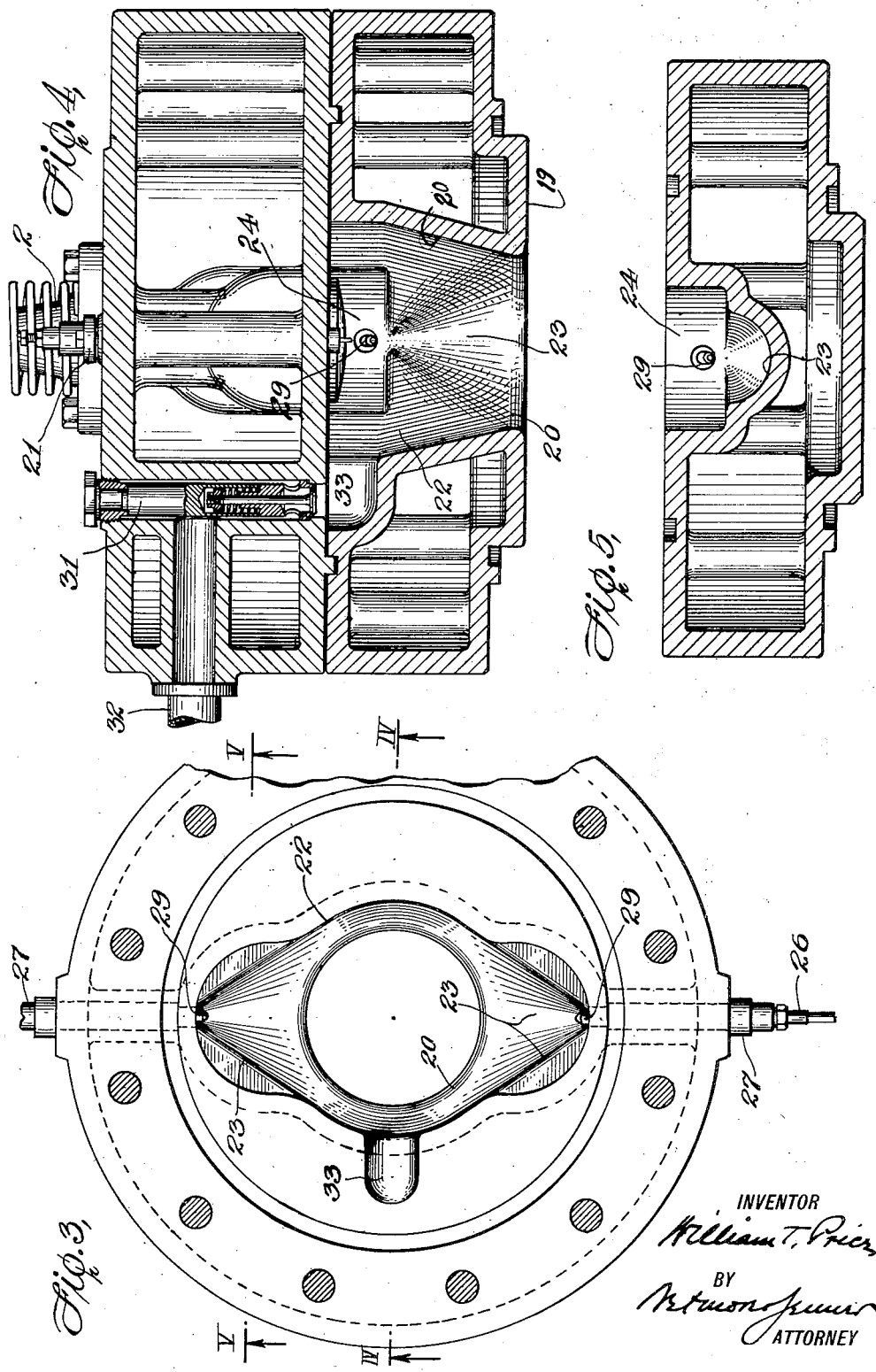

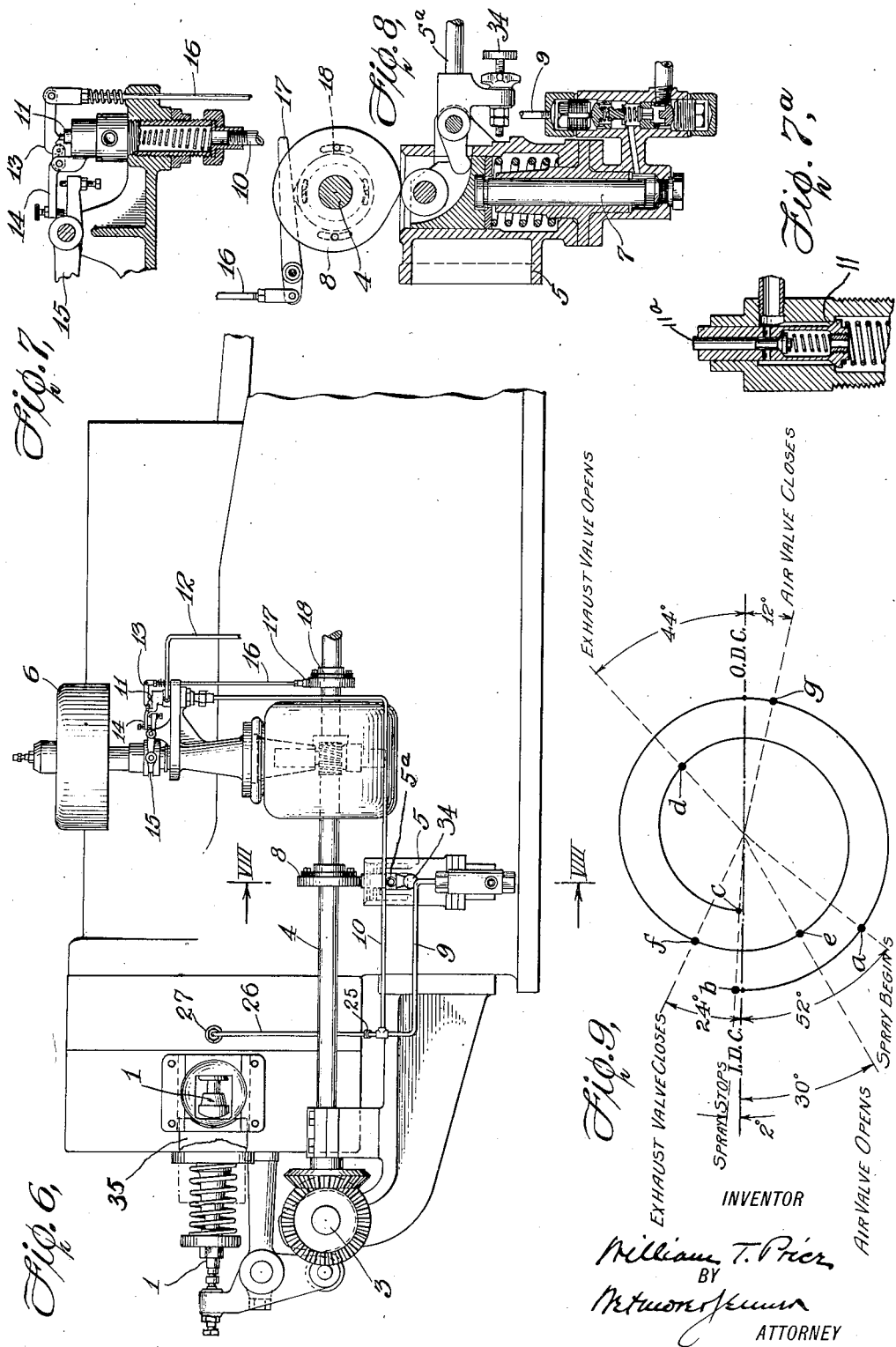

Patented Nov. 25, 1924.

1,517,015

UNITED STATES PATENT OFFICE.

WILLIAM T. PRICE, OF NEW ROCHELLE, NEW YORK, ASSIGNOR TO PRICE ENGINE CORPORATION, A CORPORATION OF NEW YORK.

OIL ENGINE.

Application filed December 10, 1917. Serial No. 206,425.

*To all whom it may concern:*

Be it known that I, WILLIAM T. PRICE, a United States citizen, residing in New Rochelle, New York, have invented the following described Improvements in Oil Engines.

The invention consists in the application of certain herein described principles to the control of the combustion cycle in engines in which liquid fuel is injected into an air charge in the combustion space without the use of spraying air. My object has been to perfect that type of engine to approximate or equal the general operating efficiency and commercial utility of the well known Diesel engine and I have successfully accomplished this result by the engine herein disclosed which illustrates the principles of the invention and which is characterized by the absence of air compressor mechanism such as required for Diesel engines, by its capability of economical operation at about half the compression of the Diesel engine or less, by the absence of any hot surface or other igniting or vaporizing element or the need thereof, by the early timing of its fuel injection, that is to say, prior to compression dead center and by its ability to operate on a fuel consumption of .41 lbs. of fuel oil per B. H. P. or less, which is substantially equal to the average Diesel economy, and also by various other novel characteristics pointed out in the accompanying claims. The elimination of air compressor mechanism avoids the necessity of developing excess power in the working cylinder to drive such mechanism, as well as the necessity of high compression to counter the chilling action of the injection air, and obviously eliminates a large amount of mechanical and operating complication and a large item of expense. The low compression pressure enables the engine to be built without the refinement of workmanship and material necessary for high compression engines and hence at relatively low cost. The absence of unjacketed surfaces or hot plate vaporizers eliminates various practical difficulties and commercial objections always present in such devices and which are too well known to require mention especially the difficulty of keeping such surfaces at a proper temperature and the loss of volumetric efficiency occasioned by them, as well as the inconvenience and the delay in pre-heating them for starting. These and other advantages are attained by the present invention in a structure giving a relatively large work output per cubic foot of piston displacement, the capacity of the engine, in this respect being substantially equal to the Diesel type and far superior to any hot surface or air-less injection engine within my experience.

Figure 2:
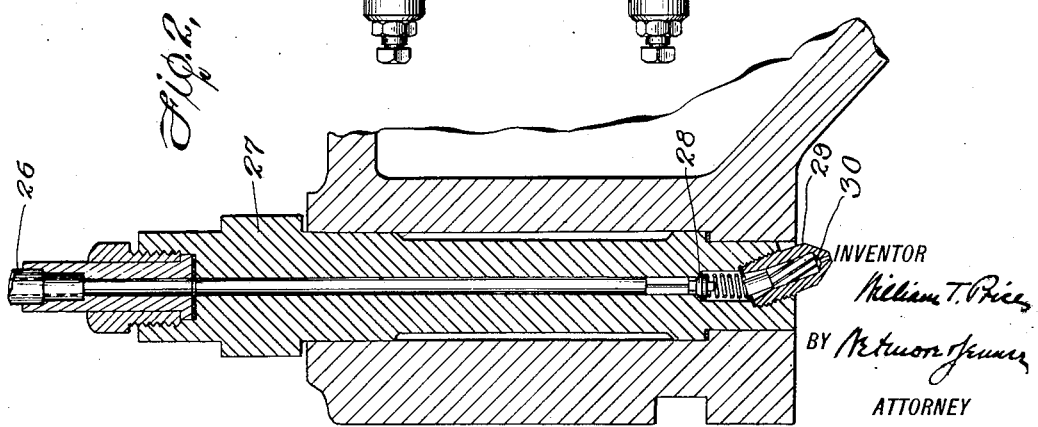

Fig. 1 is a horizontal central section through the combustion and piston space;

Fig. 2, an enlarged, full size section of a suitable fuel injection valve;

Fig. 3, an elevation of the part of the head structure on the plane of the engine valves;

Fig. 4, a cross-section of the head on line IV—IV of Fig. 3;

Fig. 5, a similar section on line V—V of Fig. 3;

Fig. 6, a partial side view of the engine showing the fuel injection means and governor control;

Figs. 7, and 7ª are details of the fuel regulator valve;

Fig. 8, a detail of the fuel pump; and

Fig. 9, a diagram of the engine cycle.

The engine taken for illustration is a horizontal engine and rated at approximately 150 H. P. It is water-jacketed throughout and as shown in Figs. 1 and 4 its cylinder head is formed in two parts both bolted to the end of the cylinder, but the head can be made in one part if desired, and in any case the water-jacket space thereof is brought as close as possible to every internal surface of the combustion chamber so as to remove heat from such surface as rapidly as possible. The inlet valve is marked 1 and the exhaust valve 2, and both are disposed side by side in the present case. The piston has a stroke of 24 inches and is 19 inches in diameter, and the other parts are approximately of the proportional dimensions indicated which adapt the engine to run at a speed of 240 R. P. M. or thereabouts as will be understood. The engine valves are operated by a cross cam shaft 3 driven by bevel gears from the main cam shaft 4 which also drives the fuel pump 5 and the governor 6. As shown in Fig. 8, the fuel pump comprises the customary pump valves and a spring-returned plunger 7 normally operated by a pump cam 8 but also capable of hand operation by a lever 5ª, and its oil delivery pipe 9 leads direct to the injection nozzles which discharge into the combustion space, a branch pipe 10 leading to the fuel regulator mechanism controlled by the governor, or which may be controlled by hand if desired. This mechanism, separately shown in Figs. 7 and 7ª consists essentially of a variably operated escape valve 11 controlling an outlet from the branch pipe 10 to an overflow pipe 12 (Fig. 6). The said valve 11 is closed by a spring and is opened to a variable extent or at variable timings according to the engine load, by a regulator lever 13 fulcrumed on the end of a short lever 14 which latter is subject to change of position by and in accordance with the change of the governor lever 15. The lever 13 is vibrated in synchronism with the pump plunger by means of a connecting rod 16, the lower end of which is connected to a lever 17 operated by a regulator cam 18 on the cam shaft. This cam is so related to the pump cam as to depress the lever 13 toward the end of the pumping stroke, and causes that lever to open the escape valve earlier or later according as its fulcrum, borne by the lever 14, is lowered or raised by the governor. By thus controlling the time of opening of the escape valve, the amount of overflow from the delivery pipe 9 and hence the amount of fuel injected into the engine is accurately measured and kept in accordance with the speed of the governor 6 or the load on the engine. Very obviously other styles of injection pumps and methods of regulation may be resorted to in place of that just described and with equal effect. It should be observed however from the shape of the fuel cam 8 and the diagram of the working cycle given in Fig. 9, that the beginning of injection of the fuel occurs a considerable period in advance of compression dead center and ends in normal operation also before dead center. The average crank angle before dead center at which the fuel is admitted, is varied to suit conditions of load and speed although large changes in load and speed can be allowed without alteration in the time of the beginning of the injection. For mechanical reasons termination of the injection at an extreme overload is slightly after dead center, that condition being indicated in the diagram of Fig. 9. It is desirable that under normal operating conditions all of the fuel be admitted before ignition is manifested (by the abrupt pressure rise indicated on the card) although no particular harm results if a small amount enters after that point.

In order to minimize the load on the governor lever, the escape valve 11 is provided with a pilot valve 11ª mounted in it and which may be arranged to be depressed by the regulator lever 13 very slightly in advance of the escape valve proper, so as to relieve the pressure on the latter and permit it to be opened easily if required. Manual control of the engine may also be accomplished by limiting the return stroke of the pump plunger which also, in the design shown, varies the time of beginning of the injection as well as the amount delivered. The screw 34 on the pump lever is the limiting means of the suction stroke of the plunger and can obviously be manipulated while the engine is running. The piston space in the engine cylinder is separated from the compression or spray space by the inwardly projecting annular wall 20 which forms a relatively contracted central opening or communication between said spaces and said wall may be formed as part of the cylinder or head structure as preferred, but is water-jacketed or equivalently cooled throughout. The end wall 19 of the piston space is at right angles to the axis of the cylinder and the piston approaches the same to within an eighth inch or so at its extreme inner position. The compression space is of compact form, being bounded on the one hand by the annular sloping wall and its contracted opening just referred to, and on the other, by the flat water-jacketed head wall which contains the valves and a spark plug 21. Its shape can perhaps be best described by saying that it has a central or body portion which is fundamentally or partly circular in cross-section as indicated at 22 and concentric to the axis of the contracted opening, but its circular contour is interrupted by the intersection and merging therewith of two oppositely located, substantially conical cavities 23, forming in effect lateral extensions from the central or body part of the space so that the resulting chamber is generally oblong but with pointed extremities. The valves 1 and 2 open respectively into these conical extensions for which reason the latter are required to be widened slightly by the formation of the cylindrical spaces 24 around the valve heads so that the valves will have adequate clearance and the air may have a free entrance to, and the exhaust gases a free exit from the chamber. With the valves located in the positions indicated, these substantially cylindrical clearance spaces necessarily interrupt the uniform conical contour of the cavities 23, but said cavities are nevertheless substantially or generally conical as above stated. The opening between the compression space and the cylinder is restricted to an area considerably less than the cross area of the cylinder.

Liquid fuel from the pump delivery pipe 9 is divided at the junction 25 (Fig. 1), equal portions passing through the two branch pipes 26 to the two injection nozzles 27, which latter are mounted in the head structure with their spray orifices in the apical regions of the conical cavities 23. Inasmuch as these nozzles are operated solely and directly by the action of a pump and require no high pressure injection air, they are herein designated as pump-operated nozzles and the engine as a pump-injection engine, meaning thereby to differentiate from the air-injection of fuel in Diesel engines. These nozzles are solid injection nozzles in the sense that no air, steam, compressed exhaust gas or other fluid pressure medium is mixed with the fuel within the nozzles and for convenience, the term "solid injection" is used in the claims in this general sense and to indicate the absence of the use of the compressed injection air commonly used in Diesel engines. Each injection nozzle comprises a tubular barrel containing a small spring-closed check valve 28 near its inner end and a nozzle tip 29 screwed into the valve at an inclination to its axis. The nozzle tip contains a spirally-grooved square-ended pin fitted snugly therein and so as to form a number of spiral paths through which the liquid fuel passes and by which it receives rotary motion in the small chamber between the squared end of the pin and the nozzle orifice, and the said orifice is of a small diameter considerably less than its length. In the case in hand, it is .036 inch in diameter. The fuel discharged from this orifice is a spray of moderately wide divergence very finely subdivided and pulverized and very homogenous, that is to say, the fine fuel particles constituting the spray cone are uniformly distributed throughout the whole cross-section of such cone. Homogeneity of the spray is important to the attainment of efficient results and is in contra-distinction to many liquid sprays, which are hollow in their interior or relatively devoid of liquid adjacent their central axes. The detail structure of the spray nozzle however is not a part of my present invention, being in general the same type of nozzle that has heretofore been used in oil injection engines of the hot surface type. Other nozzles discharging a finely pulverized and homogenous spray will give the same effect. The nozzles 27 of whatever design selected, are mounted in the cylinder head in directly opposite locations in respect to the axis of the contracted opening formed by the wall 20 and with the axes of their sprays substantially coinciding with the axes of the conical cavities 23 above referred to, the said cavities being thus symmetrical with respect to the axis of the opening and the axes of the sprays therein occupying a common plane which is also the plane of the axis of the contracted opening. The spray axes thus have their point of intersection coinciding with the axis of said opening. While accurate geometrical symmetry of the combustion space is desirable, some considerable deviation therefrom is permissible without sacrificing the principle of the invention or all of the results that accrue therefrom as will later appear. It is important however that the opposed sprays meet each other in the central region of the compression space and that they collide with the same velocity and that each represent the same rate of fuel discharge, because these relations serve to establish the conditions which I have sought to attain, and which may be described as the formation of what may be called a fog cloud of finely divided fuel, centralized in the compression space and having little or no tendency to wet the walls thereof. The conical shaped fuel sprays are spaced from the walls of the cavities they occupy and do not wet them. I have ascertained that liquid fuel wetting the wall of the chamber burns very imperfectly because such wall is water-jacketed and relatively cool, the condition being quite the reverse of other types of so-called "solid" injection engines wherein the wall of the combustion space or some part of it is unjacketed and kept very hot for the purpose of vaporizing the fuel liquid that comes in contact with it. If the sprays in the engine shown in the drawings are not in fairly accurate alignment or of equal velocity or homogeneity, one will shoot through the other and wet the chamber wall producing a smoky exhaust, the indication of imperfect combustion. Careful and symmetrical disposition of the sprays is thus quite essential to said formation of a properly centralized fog cloud to give the highest fuel economy. In the form of engine taken for illustration, the axes of the two opposed sprays intersect each other at an obtuse angle which points toward the opening to the piston space and thereby the cloud of fuel fog resulting from the impact is given a tendency to move toward the piston and counter to the flow of air which the latter is pushing into the compression space through the restricted opening during the injection. It is this condition particularly, as I have ascertained, which conduces to the efficient results attained by this engine and I consider my invention consists broadly in means for creating this effect regardless of the detail of the means by which the body or cloud of finely divided fuel is caused to be directed toward the restricted opening and counter to the air flow caused by the advancing piston.

By reason of this direction of motion, the incoming air mixes homogeneously with the fog of fuel particles with little tendency to drive them against the walls to such extent as to form a liquid film thereon and, in normal operation, the result is that at some appreciable time before the end of the compression stroke, all of the fuel has been injected and is assuming a vaporous condition which tends toward an increase in inflammability and at or slightly before the end of the stroke this condition and the increasing temperature due to compression cause ignition, the engine card indicating the explosive effect characteristic of so called constant volume engines. By advancing the average of the crank angle at which oil is injected, the fog of oil will have more time in which to assume an ignitable condition so that the point of ignition will also be advanced, and by injecting the oil later, the time will be shortened. In some forms of the engine it is necessary to inject all of the oil much earlier in the compression stroke so that more degrees of crank angle will be allowed for the ignitable condition to obtain, and in cases of slow speeds it is desirable that the average crank angle of the injection be later than in the case of high speeds inasmuch as it is found that the allowance of too long a time interval for the fuel to assume the ignitable condition has a tendency upon ignition to produce an excessively abrupt pressure rise which is undesirable from an operating standpoint. At the end of the fuel injection, the mixture is formed and is still in motion due to the residual flow from the restricted opening, so that when ignition occurs the whole compression space may be said to be completely occupied by suspended fuel particles which, however, have not had contact with the surrounding wall surfaces enough to form a liquid film thereon but have had an appreciable element of time in which to assume a vaporous and ignitable condition. In any form of the invention, the purpose is to accomplish this condition, namely, the creation of a fog cloud not in film-forming contact with the walls and which at the end of the compression stroke shall be thoroughly mixed with the air from the piston space and shall have had sufficient time to assume an ignitable condition so that ignition shall occur at or near that point. The special shape of the compression space above described is believed to provide the optimum condition for producing this effect, and in furtherance of the same purpose the central region of said space, above referred to as having a fundamentally circular section, is, for the engine illustrated, made of wider diameter opposite the opening, being more exactly frusto-conical than cylindrical. Thus the wall 20 slopes rather steeply toward the contracted opening at the sides of the space between the cavities 23 and slopes more acutely towards said opening where it coincides with such cavities. The said wall also meets the end wall 19 of the piston space with a sharp rather than a rounded edge so as to make the contracted opening the least possible like a connecting neck, or, in other words, to make it a neck of the shortest practicable length. While the particular shape of the compression space, as above described, is an important factor in the early-injection cycle herein described, it has been found also to be useful in engines operating with a later injection and a higher compression ratio and such shape is herein specifically claimed as an independent part of the present invention.

The cycle diagram of Fig. 9 shows the fuel injection as occupying some 54° of the crank angle, this being a condition of overload taken for illustration. In practice, however, it is preferred that the injection should occupy a somewhat less angle beginning later and terminating earlier even for normal full load but it is in any case well advanced as compared to Diesel engines, and notwithstanding that fuel oil is slightly compressible and notwithstanding also that there may be a slight recession of the fuel in the spray nozzles at the end of each injection period and may therefore be retarded somewhat in its actual injection. The ignition effect occurs in any event at or slightly in advance of dead centre and expansion continues for a portion of the cycle represented by the arc $c$—$d$. The exhaust valve then opens until the air valve opens, point $e$ of the diagram, and then both valves remain open until the exhaust valve closes, point $f$ of diagram and the piston will have then discharged the exhaust gas and have begun to draw in fresh air, which continues until the air valve closes, point $g$ of diagram, at which time the piston will be near its outer dead centre represented by initials O. D. C. on the diagram. The amount of air admitted during the suction stroke is subject to regulation by means of the throttle 35 shown in the drawings as a sliding damper adapted to restrict the air inlet. For light loads and small fuel injections the throttle is partly closed. From outer dead centre the indrawn air is compressed by the succeeding inward stroke of the piston until at point $a$, fuel injection again begins, coinciding with the latter part of the compression stroke. This will be recognized as the characteristic cycle of the four stroke engine, but the principles of the invention are obviously applicable also to the two stroke cycle.

When the engine is run under light load with the throttle 35 partially closed as above described, the suction effect in the combustion chamber is increased by the restriction of the air entrance, and at a certain degree of restriction, the suction is increased to such extent as to draw back some of the exhaust gas through the still open exhaust valve. The heat thereby imparted to the incoming air charge serves the useful purpose, as I have ascertained, of maintaining an adequate compression temperature in the chamber, and off-sets the tendency of the chamber wall to cool down as the result of the reduced or light-load fuel delivery. This utilization of the hot exhaust gas as part of the compression charge insures certain attainment of the ignition temperature and eliminates the tendency to misfire that otherwise might occur under light loads. It will be apparent moreover that the greater the restriction by the throttle, the greater will be the amount of hot exhaust gas and the less will be the amount of air present in the chamber so that the temperature compensation is thus automatic in character.

The compression pressure requisite to carry out the cycle above outlined may be selected according to preference. The relative dimensions, indicated in the drawings, give a compression in normal running of about 200 lbs. per sq. in. which is preferred for this engine, but is very low as compared to any Diesel engine compression. It is not sufficient to produce ignition of heavy oil fuels in a cold engine for which reason the spark plug 21 above alluded to, is mounted in the head structure. The compression however should be sufficient to cause ignition when the engine is warmed up and the engine described has been operated on pressures as low as 160 lbs. The construction of the spark plug will be plain from the drawing without description. It is arranged to be connected to any suitable source of sparking current, not shown in the drawings, and is generally left so connected, while the fly-wheel is being set in motion, and continuously emits sparks in the combustion space until the fuel injection and combustion begins and usually for several minutes thereafter until the interior surfaces are warm from the first explosions and the combustion is ready to continue spontaneously. Obviously other means could be used for establishing ignition, as for example, a burner or heater for preheating the air charge. If desired the igniter may be eliminated by the use of compression pressures adequately high to produce ignition in a cold engine.

The fly-wheel is set in motion by an air-starting valve of usual construction and such as is shown at 31 in Fig. 4. The starting air supplied through this valve, from a pipe 32, enters the combustion space at one side, through a lateral pocket 33 formed therein for the purpose. This pocket is very small and exercises no appreciable effect upon the functions of the combustion space already described.

Claims:

1. A combustion engine comprising a compression space connected to the cylinder by a restricted opening and devoid of any internal uncooled surface for vaporizing the fuel or normally controlling ignition, inlet and exhaust valves opening into said compression space and solid liquid injection means, including a plurality of impinging injection nozzles, arranged for spraying the greater part of the charge of liquid fuel into said space, directed counter to the air flow through said opening, during the latter part of the compression stroke, in combination with means normally terminating the action of the said injection means prior to compression dead center.

2. A combustion engine comprising a compression space connected to the cylinder by a restricted opening and devoid of any internal uncooled surface for vaporizing the fuel or normally controlling ignition, and solid liquid injection means, including a plurality of impinging injection nozzles, organized in said space to direct the greater part of the charge of finely divided fuel liquid thereinto in non-wetting relation to the walls thereof and counter to the air flow through said opening, during the compression stroke, in combination with means normally terminating the action of the said injection means prior to compression dead center.

3. A combustion engine comprising a compression space connected to the piston space by a restricted opening and devoid of any internal uncooled surface normally controlling fuel ignition, inlet and exhaust valves opening into said space, in combination with solid liquid injection means, including a plurality of impinging injection nozzles, organized for injecting the whole or the greater part of the fuel charge into the compression space in finely divided form prior to the completion of compression, said spaces and means being correlated to produce ignition by compression of the mixture, and means normally terminating the action of the said injection means prior to compression dead center.

4. In a combustion engine, a combustion space externally cooled throughout and comprising compression and piston spaces connected by a restricted opening substantially central to both spaces, inlet and exhaust valves opening into the compression space and cooperating to admit and confine the air charge therein, and a starting igniter in said space, in combination with solid liquid injection means, including a plurality of impinging injection nozzles, operating to inject the whole or the greater part of the required fuel charge into said air charge during the latter part of the compression stroke, including means normally terminating the action of the said injection means prior to compression dead center, said spaces being correlated to the piston displacement to produce ignition, in the normal operation of the engine, by compression of the mixture and independently of the presence or effect of said starting igniter.

5. A combustion engine comprising a combustion space, externally cooled throughout and provided with fuel injection means, including a plurality of impinging injection nozzles, for creating a fuel and air mixture therein during the latter part of the compression stroke, including means normally terminating the action of the said injection means prior to compression dead center, said engine being organized in its normal operation to produce ignition of the mixture solely by the compression thereof, in combination with means for initiating combustion in said space when the engine is cold, consisting of an electrically operated heat source located within said space.

6. In an internal combustion engine, the combination of a compression space externally cooled throughout and opposed solid injection fuel nozzles arranged for injecting the whole or the maximum part of the liquid fuel charge, as impinging sprays, into said space prior to compression dead center, said impinging sprays being organized to form a centrally located body of finely divided fuel so directed as to avoid wetting or film-forming contact with the surface of said space.

7. In an internal combustion engine, the combination of a water-jacketed combustion space connected to the cylinder by a restricted opening and having opposed solid injection fuel nozzles, each delivering a spray of fuel therein substantially parallel to and spaced out of contact with the walls of said space.

8. In a combustion engine, a piston space and an externally cooled compression space connected thereto by an opening of less diameter than the smallest diameter of said compression space, said latter space being constituted of a central region and two opposed lateral extension cavities containing solid injection nozzles simultaneously delivering their fuel sprays into mutual impingement in said central region.

9. In a combustion engine a piston space and a compression space connected thereto by a restricted opening and constituted of a central region and two opposite lateral extention cavities, inlet and exhaust valves occupying said cavities and simultaneously pump-operated nozzles contained in said cavities and delivering equal fuel sprays into mutual impingement in said central region.

10. A combustion engine comprising an air compression space devoid of any internal uncooled surface normally controlling ignition, opposed pump-operated solid injection nozzles organized for simultaneous operation to create a foglike explosive mixture of the fuel charge with the air in said space during, and before the end of, the compression stroke, said space being correlated to the piston displacement to produce compression to ignition of said mixture.

11. A combustion engine comprising an air compression space devoid of any internal uncooled surface for vaporizing the fuel or normally controlling the ignition and provided with opposed solid injection fuel nozzles organized to create a mixture of the whole or the greater part of the fuel charge with the air in said space during, and before the end of the compression stroke, said nozzles having the axes of their respective sprays intersecting at an obtuse angle in the center of said space and the fuel, after impingement, having a resultant motion toward the piston.

12. In an injection oil engine having its operating parts organized to create a fuel and air mixture in the compression space during the compression stroke and to compress the mixture to ignition, the combination of opposed solid injection fuel spray nozzles disposed in the compression space of said engine with the axes of their respective sprays intersecting at an obtuse angle.

13. In a combustion engine of the kind described, the combination of a piston space connected by a relatively contracted opening to a compression space which is entirely externally cooled, and provided with opposed pump-operated injection nozzles symmetrically arranged therein and equally and simultaneously operated to inject the normal charge during the latter part of the compression stroke.

14. In a combustion engine, the combination of a compression space constituted by a central body portion and substantially conical symmetrically disposed extension cavities, fuel injection nozzles mounted in the apical regions of said cavities and respectively discharging their fuel sprays toward the central axis of said body portion and a fuel pump simultaneously and equally operating said nozzles to inject the greater part of the fuel charge during the compression stroke.

15. In an injection engine, the combination of a compression space constituted by a relatively compact central or body portion having lateral substantially conical extension cavities, and connected to the piston space by a relatively contracted opening, the axes of said cavities intersecting at an obtuse angle which is directed toward said opening, solid injection fuel spray nozzles respectively coaxially mounted in the apical regions of said cavities and means for simultaneously discharging equal opposing sprays from said nozzles toward the center of said compression space during the compression stroke.

16. In an injection engine, the combination of a compression space entirely water-jacketed and constituted of a relatively compact central part with substantially conical opposed extension cavities, pump-operated injection nozzles having their orifices situated in the apical regions of said cavities and arranged to direct their fuel sprays to intersect each other and the axis of said central part.

17. In an injection engine the combination with the piston space and an externally cooled compression space connected therewith by a relatively contracted opening, said compression space being formed with lateral substantially conical extension cavities and provided with pump-operated injection nozzles having their orifices in the apical regions of said cavities and directing their respective sprays toward the axis of said contracted opening.

18. In an injection engine, a compression space provided with opposed pump-operated fuel injection nozzles each nozzle containing means for whirling the liquid fuel issuing from its nozzles orifice and the axes of said orifices being arranged to intersect each other near the center of the compression space.

19. In an injection engine, a compression space connected with the piston space by a relatively contracted opening and provided with opposed pump-operated fuel injection nozzles with their axes intersecting at an obtuse angle and adapted to impart a resultant motion of the fuel toward said opening to the piston space.

20. In an injection engine an externally cooled compression space connected by a relatively restricted passage with the piston space and provided with opposed pump operated fuel injection nozzles disposed at the most remote points of said space and projecting their respective sprays into mutual impingement at the center of said space during the compression stroke in combination with means normally terminating the action of said nozzles prior to compression dead center.

21. An oil engine comprising in combination an air compression space connected by a restricted opening to the piston space and devoid of any uncooled surface for normally controlling its ignition, inlet and exhaust valves opening into said space, solid liquid injection means, including a plurality of impinging injection nozzles, operating to deliver the greater part of the fuel charge into said space during the latter part of the compression stroke, including means normally terminating the action of the said injection means prior to compression dead center, means for varying the amount of the fuel charge, and means for insuring the presence of a predetermined amount of the exhaust gas in the cylinder adapted to maintain the engine temperature when the fuel charge is reduced.

22. A combustion engine comprising a compression space connected to the cylinder by a restricted opening and devoid of any internal uncooled surface for normally controlling ignition, and solid injection means organized to spray the greater part of the liquid fuel charge into said space during the compression stroke, in combination with inlet and exhaust valves having overlapping open periods, means for varying the size of the fuel charge and means for throttling the inflow of air through the inlet valve.

23. A combustion engine comprising a compression space connected to the cylinder by a restricted opening and devoid of any internal uncooled surface for vaporizing the fuel or normally controlling ignition and solid liquid injection means organized in said space to direct a charge of finely divided fuel liquid thereinto in spaced relation to the walls thereof during the compression stroke, in combination with means normally terminating the action of said injection means prior to compression dead center.

24. In an injection engine, a cylinder head containing a central air-compression space having communication with the piston space through a relatively restricted opening and having fuel injector cavities extending in opposite directions from said opening, means for externally cooling all of the cylinder head walls forming said space and cavities, a solid liquid fuel injector disposed in each cavity and discharging their respective fuel sprays into mutual impingement in said central space, and means for causing said fuel injectors to inject the whole or greater part of the fuel charge prior to compression dead center, the several parts being suitably correlated to the piston displacement to produce ignition by compression of the mixture.

25. In an injection engine, an air compression chamber comprising a central space having communication with the piston space through a relatively restricted opening and having opposed cavities extending laterally from the axis of said opening, a solid liquid fuel injector disposed in each cavity, said injectors being organized to discharge their respective fuel sprays into mutual impingement at an angle to each other so as to produce a resultant spray movement toward said restricted opening, the walls forming said cavities being substantially parallel to the spray cones produced by said injectors and adjacent to, but out of contact therewith, and means for externally cooling all of the walls of said compression chamber whereby the ignition temperature is obtained from the heat of compression.

26. In an injection engine an air compression chamber comprising a central space having communication with the piston space through a relatively restricted opening and having opposed cavities extending laterally from the axis of said opening, a solid liquid fuel injector disposed in each cavity and a valve disposed in the side of each cavity, said injectors being organized to discharge their respective fuel sprays into mutual impingement adjacent said restricted opening, all of the chamber walls forming said central space and cavities being provided with means for externally cooling them throughout whereby the ignition temperature is obtained from the heat of compression.

27. In an injection engine, an air compression chamber water-jacketed throughout and composed of a central space having communication with the piston space through a substantially circular opening of less diameter than the smallest diameter of said chamber and also having fuel injector cavities extending oppositely from said central space, a solid liquid fuel injector in each cavity directed toward said central space and adapted to discharge their respective fuel sprays into mutual impingement therein and means for simultaneously operating said injectors.

28. In an injection engine, an air compression chamber externally cooled throughout and composed of a central space having communication with the piston space through a substantially circular relatively restricted opening and also having substantially conical fuel injector cavities extending oppositely from said central space, a solid liquid fuel injector in the apical end of each cavity, an engine valve in the side of each cavity, said injectors being organized to discharge their respective fuel sprays into mutual impingement adjacent said opening and means for simultaneously operating said injectors to deliver the greater part of the fuel charge during the latter part of the compression stroke.

29. In an injection engine, an air compression chamber comprising a central space having communication with the piston space through a restricted opening and having fuel injector cavities extending oppositely from said central space, inlet and exhaust valves disposed, one in the side of each cavity and parallel to each other and fuel injectors disposed in said cavities substantially in the common plane of said valves.

30. In an injection engine, an air compression chamber composed of a central space having communication with the piston space through a restricted opening and having substantially conical fuel injector cavities extending oppositely from said central space, one of the walls forming said chamber being substantially flat and provided with valve seats respectively opening into said cavities, parallel valves co-acting with said valve seats and a fuel injector mounted in each of said cavities.

31. In an injection engine having an air compression chamber composed of a central space and two opposed fuel injector cavities in communication with the piston space through a relatively restricted opening, a two-part detachable head structure, one of the parts thereof constituting the wall forming said restricted opening and the adjacent portions of said cavities and the other part forming the remainder of the chamber enclosure and having one or more valve openings therein, and fuel injectors mounted in one of said head parts organized to direct their sprays into mutual impingement.

32. In an injection engine having opposed fuel injectors and an air compression chamber connected to the piston space by a restricted opening, the combination with the engine cylinder of a two-part head structure therefor, one of the parts constituting the wall forming said restricted opening and provided with a surrounding water-jacket space for cooling said wall, and the other forming the remainder of the compression chamber and also provided with a water-jacket space and having one or more valve-openings therein, and opposed fuel injectors mounted in the sidewall portions of said head parts to direct their sprays into impingement at a point in said chamber adjacent said restricted opening.

33. In an injection engine having opposed fuel injectors and an air compression chamber connected to the piston space by a restricted opening, the combination with the cylinder, of a two part head structure, one of the parts constituting the wall forming said restricted opening and provided with a water-jacket space to cool said wall, and having opposed fuel injectors therein and the other part constituting the wall forming the remainder of said chamber and provided with a water-jacket space and having one or more valve openings therein.

In testimony whereof, I have signed this specification.

WILLIAM T. PRICE.